United States Patent [19]
Zornow

[11] Patent Number: 5,240,291
[45] Date of Patent: Aug. 31, 1993

[54] SANITARY HOSE COUPLER

[76] Inventor: Jeffrey S. Zornow, 9151 Normandy La. South, Centerville, Ohio 45458

[21] Appl. No.: 909,028

[22] Filed: Jul. 6, 1992

[51] Int. Cl.$^5$ ............................................. F16L 35/00
[52] U.S. Cl. ...................................... 285/40; 285/92; 285/93; 285/175; 285/251
[58] Field of Search ............... 285/251, 40, 92, 93, 285/175, 258, 49

[56] References Cited

U.S. PATENT DOCUMENTS

| | | | |
|---|---|---|---|
| 1,684,713 | 9/1928 | Norgram. | |
| 2,029,846 | 2/1936 | Henke | 285/251 |
| 2,360,761 | 10/1944 | Clickner | 285/251 |
| 3,032,358 | 5/1962 | Rolston | 285/251 X |
| 3,177,016 | 4/1965 | Holmyren | 285/251 X |
| 3,246,921 | 4/1966 | Lyon et al. | 285/251 X |
| 3,791,680 | 2/1974 | Cleare | 285/251 X |
| 3,820,825 | 6/1974 | Morin | 285/39 |
| 3,838,873 | 10/1974 | Gilbert | 285/174 |
| 4,054,305 | 10/1977 | Gajajiva et al. | 285/39 |
| 4,162,092 | 7/1979 | Hayes | 285/39 |
| 4,165,106 | 8/1979 | Gladden | 285/39 |
| 4,909,545 | 3/1990 | Hohol | 285/39 |

OTHER PUBLICATIONS

Sani-Tech Brochure-1992.

Primary Examiner—Dave W. Arola
Attorney, Agent, or Firm—R. William Graham; H. Stanley Muir

[57] ABSTRACT

A novel coupler for use in sanitary transport of material which includes a female piece having a first end and a second end, the first end having an inner threaded surface defining an opening therein to receive an end of a hose, the second end having an inner threaded surface defining an opening adjacent and coaxial with the opening of first end to form a passageway along a central axis of the female piece allowing communication through the female piece, wherein the threaded surface of the first end has a relatively thin razor-like edge which extends diagonally inwardly toward the central axis and the second. A hollow male piece is provided having a tapered first end, an intermediate portion, and a second end. The intermediate portion has a portion of its outer surface threaded in a complimentary manner to the threaded opening of the second end of the female piece to allow receipt of the male piece therein. A shoulder extends radially outward from the intermediate portion and means for sealing between the shoulder and the second end of the female piece are provided when the male piece is threadedly connected to the female piece.

10 Claims, 3 Drawing Sheets

SANITARY HOSE COUPLER

BACKGROUND OF THE INVENTION

This invention relates to a hose coupler and, more particularly, to an improved coupler for attachment to a hose to provide a sealed conduit which is not susceptible to bacteria or other contaminants at the coupler connection. In the area of consumable bulk liquids, such as milk, consumable bulk powders and granular materials, such as dry powder milk, there is a need for minimizing the exposure of such bulk liquids, powders and granular materials to bacteria or other contaminants. The industry has relied upon a steel barbed coupler attached with compression straps for hoses in applications transporting this type of bulk product. Other coupler designs have included a piece which conforms to the hose's inner surface to aid in sealing and maintaining sanitary conditions.

Other attempts at providing a suitable sanitary coupler required vulcanizing the hose at the coupler/hose interface. Vulcanizing hardens the hose and eventually permits the capillary action between the hose and metal coupling. With this design, it was found if the hose was damaged, the entire unit had to be discarded. This proved to be quite costly and such couplers found little success in the industry. These types are still used in the industry; however, they are becoming less popular as users search for more sanitation. Internally expanded couplings begin in two parts: a "stem" and a "sleeve". To couple a hose, a sleeve is first placed over the hose's outer dimension. The assembly is then placed on a machine-driven tapered mandrel with die fingers capable of expanding. The stem is expanded into the inside diameter of the hose, thereby permanently compressing the rubber hose into the sleeve. These provided a somewhat suitable coupler for sanitary purposes, but, like the vulcanized coupler, were too costly because the coupler became part of the hose and had to be discarded upon damage.

A variety of other types of hose couplers exist which form a connection at the hose/coupler/hose or hose/coupler/coupler interfaces. One coupler type has a narrowing tapered threaded opening and creates threads on an end of a rigid pipe by forcing an end of the pipe into the threaded opening to create the connection. Another coupling type threads onto the end of a pre-threaded pipe. Loose tolerances in the couplers and hoses have thus far prevented a suitable fit and seal from being consistently achieved for sanitary communication of product through the hoses and couplers. The coupling devices have heretofor been complex and/or costly and, in many cases, inconvenient to use. At the present time there is a need for a coupling which is relatively simple to assemble, less costly, and provides a substantially sanitary seal. In addition, there is a need for a coupler which provides a sanitary seal at flexible hose ends when assembled, and which can be readily assembled and disassembled.

SUMMARY OF INVENTION

It is an object of the present invention to provide a coupler which provides an improved sanitary seal when assembled.

It is another object of the present invention to provide an improved coupler which is readily assembled and disassembled from an unthreaded flexible hose.

It is yet another object of the present invention to provide an improved sanitary coupler which is reusable.

It is still another object of the present invention to provide a coupler with a visible sanitary seal, to allow easy inspection without disassembling the coupler.

The present invention is directed to a coupler including a female coupler piece threadedly connected to a male coupler piece having a seal ring at their interface to provide a sanitary seal between the two and which permits visual inspection of its sealed condition. The invention is further characterized by a second set of threads in the female coupler having a unique thread design for self threading about one end of an unthreaded flexible hose and a portion of the male connector piece extending into the hose end, and as it is screwed into the female piece, to force the hose out against the second set of threads in the female coupler piece. The unique thread design, a modified buttress-like thread, of the female coupler piece is characterized by being chamfered away from the opening through which the hose is inserted, to inhibit disengaging should the hose be pulled away form the coupler.

Accordingly, an embodiment of the present invention is directed to a coupler particularly well suited for sanitary use comprising a female piece having a first end and a second end, the first end having an inner threaded surface defining an opening therein to receive an end of a hose, the second end having an inner threaded surface defining an opening adjacent and coaxial with the opening of first end to form a passageway along a central axis of the female piece allowing communication through the female piece.

The coupler further includes a hollow male piece having a first end, an intermediate portion, and a second end. The intermediate portion has a portion of its outer surface adjacent to the first end which is threaded in a complimentary manner to the threaded opening of the second end of the female piece to allow receipt of the male piece therein. The intermediate portion also has a radially outwardly extending shoulder adjacent to the end of the male piece, and means for sealing between the shoulder and the second end of the female piece when the male piece is threadedly connected to the female piece.

The first end of the male piece is tapered and has a portion further displaced from the intermediate portion of slightly less diameter than an inner diameter of the hose and a portion adjacent to the intermediate portion of slightly larger diameter than the inner diameter of the hose.

The threaded surfaces of the female piece are threaded in an opposite direction. The threaded surface of the first end of the female piece provides a relatively thin razor-like edge which extends diagonally inwardly toward the central axis and the second end of the female piece.

The means for sealing includes an O-ring. The second end of the female piece terminates in a collar with an annular groove defined therein to receive the O-ring.

DETAILED DESCRIPTION OF THE PREFERRED EMBODIMENTS

Figure 1:
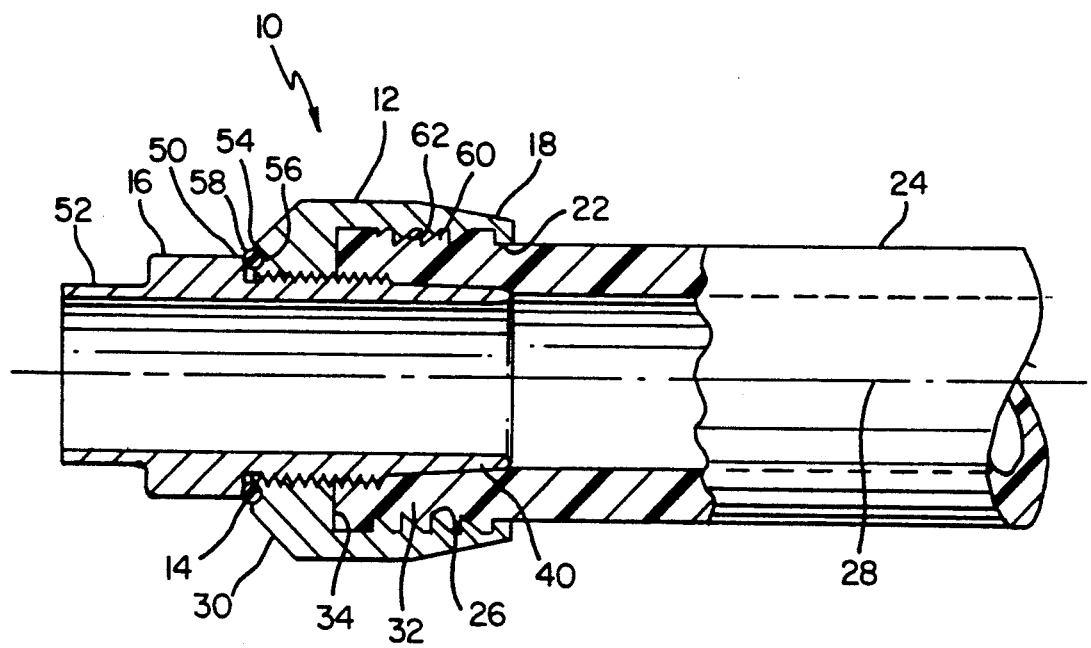
FIG. 1 is an assembled central longitudinal section through the coupler.

Referring to the drawings, a sanitary coupler 10 is provided with a generally cylindrical female piece 12, an O-ring 14, and a male piece 16. FIG. 1 shows the coupler in its assembled state, whereas FIG. 2 shows each of the pieces in an elongated state.

Figure 2:
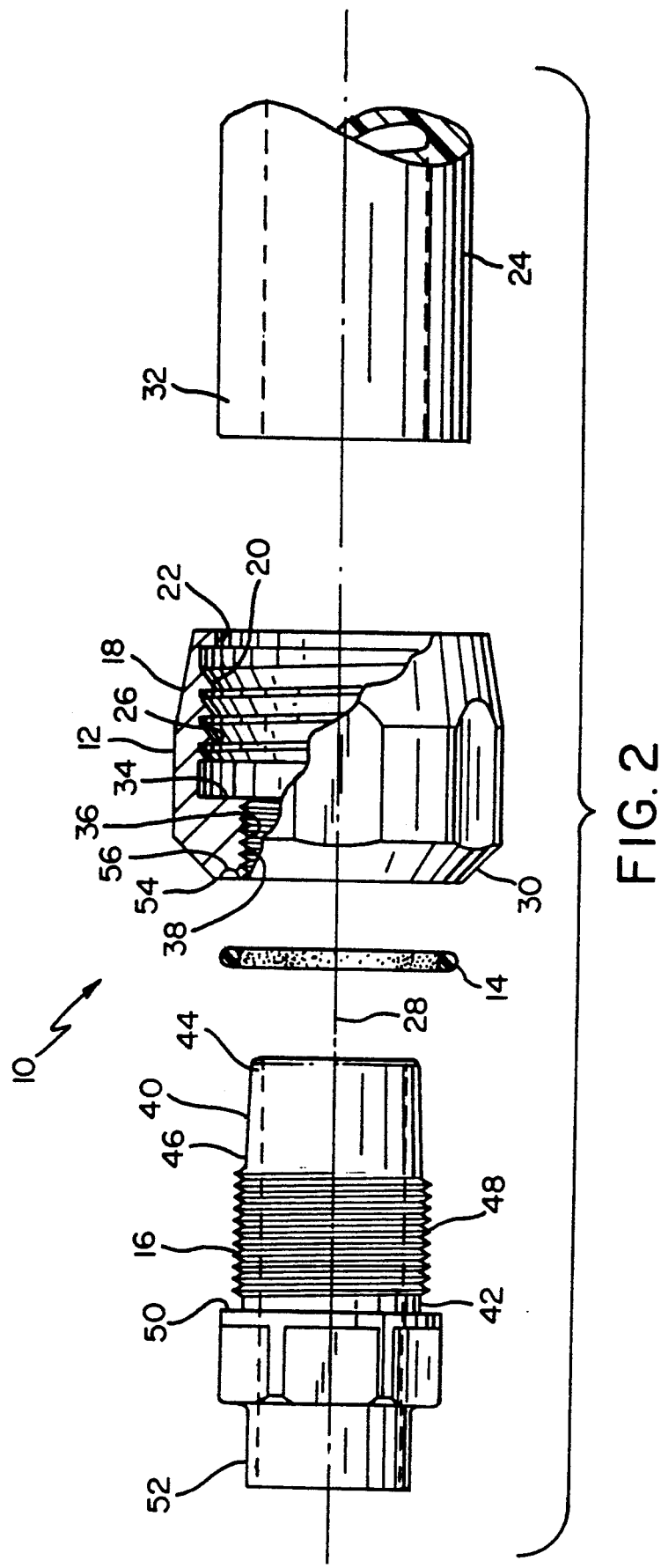
FIG. 2 is an exploded side view of the coupler embodying the invention.
Figure 3:
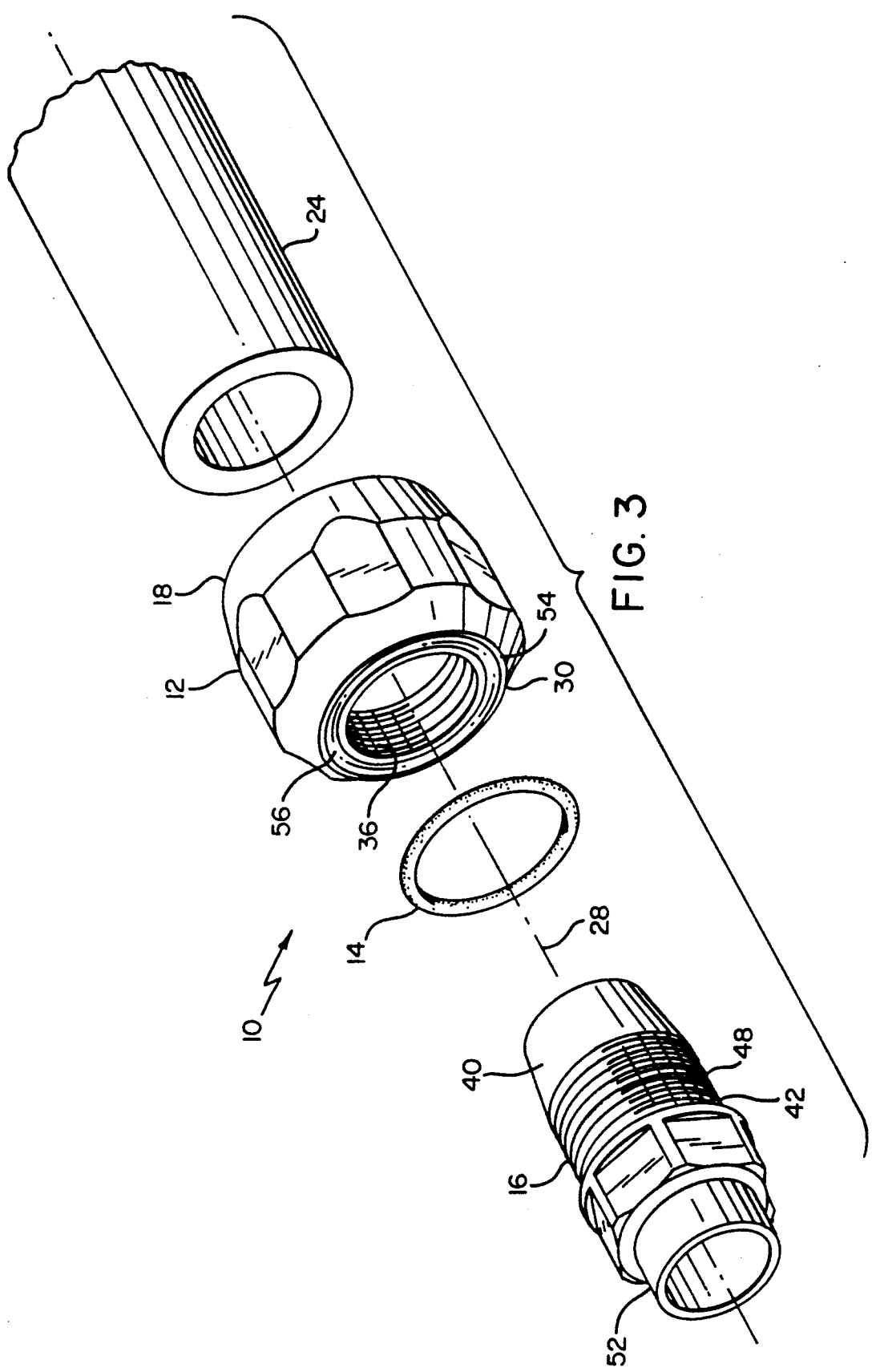
FIG. 3 is an exploded perspective view of the coupler embodying the invention.

As best seen in FIG. 2, the female piece 12 has within a first end 18 an inner threaded surface 20. The surface 20 of first end 18 generally defines an opening 22 which is to receive an end of an unthreaded flexible, non-metallic hose 24 or the like, used for sanitary transport of product. The thread direction of threaded surface 20 is formed in a fashion, e.g. counterclockwise, to prevent the hose from turning out of female piece 12 when assembling the female piece 12 to the male piece 16 in a clockwise fashion, as explained above. In conjunction with this feature, the threaded surface 20 has a relatively thin razor-like edge 26 which extends diagonally inwardly toward a central axis 28 and a second end 30 and into the axial region defined by the opening 22. After the female piece 12 has been properly threaded onto the hose 24, the hose end 32 abuts the ledge 34. Within the second end 30 of the cylindrical female piece 12, a threaded surface 36 forms an opening 38 for receiving first end 40 of male piece 16 therethrough and an intermediate portion 42 of male piece 16 therein. Openings 22 and 38 form a stepped passageway along the axis 28 and which allows for communication through female piece 12. It is to be noted that threaded surface 36 and 20 are oppositely threaded, i.e. if the threads of surface 30 are formed in a clockwise direction, the threads of surface 20 would be formed in a counterclockwise direction to prevent unwanted hose turning as stated above.

The first end 40 is preferably tapered having a portion 44 of slightly less diameter that the inner diameter of the hose 24 and a portion 46 of slightly larger diameter than the inner diameter of the hose 24. The tapered design of the first end 40 allows for easy acceptance and positioning of the male piece into the inner diameter of the hose while providing radially outward pressure on the inner surface of the hose 24 to lend to the locking advantage described below.

The intermediate portion 42 has an external threaded surface 48 formed in a complimentary manner to threaded surface 36 of female piece 12 allowing threaded connection thereof. Disposed adjacent to the threaded surface 48 and axially further displaced from the first end 40 is a radially extending shoulder 50. Male piece 16 has a second end 52 that is formed in a manner to be readily connected to a fixture used in the sanitary transport industry. For example, a standard sanitary end, e.g. Tri-Clamp ® by Laddish Co., Wisconson or I-Line ™ and Q-Line by Cherry Burrell, Iowa, may be welded, braxed, or soldered to second end 52. The assembly is then ready to be connected to sanitary equipment like receiving pumps, processing equipment, storage vats, transport trucks, etc.

The end 36 of female piece 12 includes a collar 54 which has an annular groove 56. The annular groove 56 is shaped to seat a portion of the O-ring 14.

In the assembled form as shown in FIG. 1, the shoulder 50 compresses the O-ring 14 against the collar 54. This results in a novel seal which leaves a portion 58 of the O-ring 14 protrudingly exposed to provide the benefit of inspectability and prevent bacteria or other contaminants from entering at the junction between female piece 12 and male piece 16. The present invention finds itself particularly well-suited for use in transferring products which must remain substantially sanitary. It will be readily apparent to those skilled in the art that the coupler of the present invention can be made in a variety of sizes to accommodate a number of flexible, non-metallic hoses from a number of manufacturers, e.g. Whiteflexwing ® by Goodyear Rubber Company, Akron, Ohio; Foodmaster and Cellarmaster ® by Gates Rubber Co., Denver, Colo.; Transporter ® by H.D.B. Industries, Bellfontaine, Ohio.

The coupler is assembled as follows. Female piece 12 is placed with opening 22 about the hose end and rotated to draw the hose end into the passageway penetrating female piece 12. In so doing, the outer surface of the end of the hose 24 is threadedly cut by threaded surface 20. The hose 24 is now in the correct position when it bottoms out on ledge 34. Thus, a fine complimentary groove (not shown) is formed in the outer surface of the hose 24. The groove is sufficiently deep such that when threaded together with the threaded surface 20, exiting axial movement of the hose 24 is prevented, yet the groove is not too deep to cause noticeable loss of hose wall integrity. Upon the complete insertion of the first end 40 into the hose 24, a portion 60 of the outer surface of the hose 24 is forced into the groove 62 of the threaded surface 20 forming a slight serpentine-like protruded area 60. The first end 40 not only forces the hose against the threads, but also creates a first sealing interface between the female piece 12 and the inner diameter of the hose wall. This further locks the hose 24 within the female piece 12.

Prior to the insertion of male piece 16, the O-ring 14 is placed in the annular groove 56 and maintained therein. Female piece 12 is positioned to receive the first end 40 of the male piece in the opening 38. Male piece 16 is rotated to be threadedly drawn into female piece 12. As male piece 16 is threaded into female piece 12, the shoulder 50 nears and ultimately abuts the O-ring 14. At this point, it is found desirable to further thread male piece 16 into female piece 12 until sufficient resistance builds at the interface between the shoulder 50, O-ring 14, and collar 54 to substantially secure male piece 16 in place and prevent rotation and axial movement of male piece 16 with respect to female piece 12.

This further threading results in a slight bulging of the O-ring 14 constituting the portion 58. The juncture formed by the interconnection of the shoulder 50, O-ring 14, and collar 54 is found to provide a highly suitable and improved seal against not only leakage, but also bacteria and contaminants. The juncture therefore provides the coupling with the unique capability of sanitary transfer of product.

While a preferred embodiment has been set forth above, it is intended only to present the invention in an embodiment. It will be readily apparent to those skilled in the art that many obvious modifications, derivations, and improvements exist and are intended to be included within the scope of the invention and appended claims hereto.

What is claimed is:

1. A coupler for flexible hose which is particularly well suited for sanitary use, comprising:
   a female piece having a first end and a second end, said first end having an inner threaded surface defining an opening therein to receive an end of the hose, said second end having an inner threaded surface defining an opening adjacent and coaxial with said opening of said first end to form a passageway along a central axis of said female piece allowing communication through said female piece;

a hollow male piece having a first end, an intermediate portion, and a second end, said first end of a smaller diameter than said openings of said female piece, and said intermediate portion having a portion of its outer surface adjacent said first end and threaded in a complimentary manner to said second end of said female piece to allow threaded receipt of said male piece in said second end of said female piece, and said intermediate portion having a radially outwardly extending shoulder adjacent to said second end of said male piece; and means for sealing between said shoulder and said second end of said female piece when said male piece is threadedly connected to said female piece wherein said sealing means is disposed between said shoulder and said second end of said female piece in a manner to remain partially visible when connected and wherein said sealing means acts to aid in securing said male piece in place and prevent rotation and axial movement thereof with respect to said female piece while being visible to confirm the integrity of said sealing means.

2. The coupler of claim 1, wherein said first end of said male piece is tapered having a portion furthest displaced from said intermediate portion of slightly less diameter than an inner diameter of the hose and a portion adjacent to said intermediate portion of slightly larger diameter than the inner diameter of the hose.

3. The coupler of claim, wherein said threaded surfaces of said female piece are threaded in an opposite direction.

4. The coupler of claim, wherein said threaded surface of said first end of said female piece provides a relatively thin razor-like edge which extends diagonally inwardly toward said central axis and said second end of said female piece.

5. The coupler of claim, wherein said second end of said female piece terminates in a collar with an annular grooved surface therein and said means for sealing includes an O-ring disposable within said grooved surface, wherein a seal is formed by compressing said O-ring at a center axis thereof in said annular grooved surface in a manner which forces a portion thereof to seat in said annular grooved surface between said second end of said female piece and said shoulder and forces another portion of said O-ring to protrude outwardly from said coupler in a visible manner.

6. A coupler particularly well suited for sanitary use, comprising:

a female piece having a first end and a second end, said first end having an inner threaded surface defining an opening therein to receive an end of a hose, said second end having an inner threaded surface defining an opening adjacent and coaxial with said opening of said first end to form a passageway along a central axis of said female piece allowing communication through said female piece, wherein said openings are oppositely threaded and wherein said second end of said female piece terminates in a collar with an annular grooved surface defined therein;

a hollow male piece having a first end, an intermediate portion, and a second end, said first end of a smaller diameter than said openings of said female piece, and said intermediate portion having a portion of its outer surface adjacent said first end threaded in a complimentary manner to said second end of said female piece to allow threaded receipt of said male piece in said second end of said female piece, and said intermediate portion having a radially outwardly extending shoulder adjacent to said second end of said male piece; and an O-ring disposed in said grooved surface between said shoulder and said collar when said male piece is threadedly connected to said female piece and wherein said O-ring remains partially visible when connected and wherein said O-ring, said shoulder and said collar act to aid in securing said male piece in place and prevent rotation and axial movement of said male piece with respect to said female piece and absorb shock between said female piece and male piece and further provide visual confirmation of seal integrity.

7. The coupler of claim 6, wherein said first end of said male piece is tapered having a portion furthest displaced from said intermediate portion of slightly less diameter than an inner diameter of the hose and a portion adjacent said intermediate portion of slightly larger diameter than the inner diameter of the hose.

8. The coupler of claim 6, wherein said threaded surface of said first end of said female piece provides a relatively thin razor-like edge which extends diagonally inwardly toward said central axis and said second end of said female piece.

9. A coupling for a flexible hose comprising:

a generally cylindrical male piece having a passageway extending along its central axis, a first end adapted for sanitary connection to a pipe, and a second end smaller in diameter than said first end to define a shoulder therebetween, said second end having an externally threaded portion adjacent said shoulder; and a generally cylindrical female piece adapted for cooperative connection with said male piece, said female piece having a passageway extending along its central axis of greater diameter than said second end of said male piece to permit said second end of said male piece to pass therethrough, a first end of said female piece having a portion of a surface defining said passageway threaded for cooperative engagement with said externally threaded portion of said male piece, and a second end having another portion of the surface defining said passageway oppositely threaded from the direction of said threaded surface of said first end, said threaded surface on said second end of said female piece being buttress like formed in an acute angle from a root to a crest of said threaded surface toward said first end of said female piece and wherein an annular grooved surface is defined along said first end of said female piece; and an O-ring disposably seated in said grooved surface wherein said O-ring, said shoulder and said first end of said female piece act to aid in securing said male piece in place and prevent rotation and axial movement of said male piece with respect to said female piece, said O-ring so positioned to absorb shock between said male piece and said female piece when said coupling is assembled, and wherein said O-ring is seated in said grooved surface in a manner which provides visual confirmation of seal integrity when said coupling is assembled.

10. The coupling of claim 9, wherein said first end of said male piece is of slightly smaller diameter at its termination point than along the rest of its length to facilitate insertion into the opening of a hose having its end residing in said passageway portion of said female piece second end, and said first end of said male piece generally of a diameter to force the hose outwardly against said threaded surface portion of said second end of said female piece forming a seal at the interface thereof.

* * * * *

UNITED STATES PATENT AND TRADEMARK OFFICE
CERTIFICATE OF CORRECTION

PATENT NO.   : 5,240,291
DATED        : August 31, 1993
INVENTOR(S)  : Keffreu S. Zornow It is certified that error appears in the above-indentified patent and that said Letters Patent is hereby corrected as shown below:

In claim 3, column 5, line 34 after "claim" insert —1—.

In claim 4, column 5, line 37 after "claim" insert —1—.

In claim 5, column 5, line 42 after "claim" insert —1—.

Signed and Sealed this

Thirtieth Day of August, 1994

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,240,291
DATED : August 31, 1993
INVENTOR(S) : Jeffrey S. Zornow

It is certified that error appears in the above-indentified patent and that said Letters Patent is hereby corrected as shown below:

In claim 3, column 5, line 34, after "claim" insert --1--.

In claim 4, column 5, line 37, after "claim" insert --1--.

In claim 5, column 5, line 42, after "claim" isnert --1--.

Signed and Sealed this

First Day of November, 1994

Attest:

BRUCE LEHMAN

*Attesting Officer*  *Commissioner of Patents and Trademarks*